US006914522B2

(12) United States Patent
King et al.

(10) Patent No.: US 6,914,522 B2
(45) Date of Patent: Jul. 5, 2005

(54) CLAMPING CIRCUIT FOR AN RF RECEIVER SYSTEM

(75) Inventors: Ronald O. King, Brownstown, MI (US); Matthew Honkanen, Royal Oak, MI (US); Tom Tang, Novi, MI (US); Mark Enderich, Riverview, MI (US); Eric Honsowetz, Redford, MI (US)

(73) Assignee: Lear Corporation, Southfield, MI (US)

( * ) Notice: Subject to any disclaimer, the term of this patent is extended or adjusted under 35 U.S.C. 154(b) by 51 days.

(21) Appl. No.: 10/444,886

(22) Filed: May 23, 2003

(65) Prior Publication Data

US 2004/0233047 A1 Nov. 25, 2004

(51) Int. Cl.[7] .................... B60R 25/10; G08B 1/08; H04B 1/10
(52) U.S. Cl. .............. 340/426.36; 340/539.1; 340/825.69; 340/7.32; 455/222; 455/296; 375/232; 375/346
(58) Field of Search .................. 340/426.36, 428, 340/426.13, 426.16, 426.18, 426.26, 426.2, 426.21, 539.1, 539.3, 539.16, 539.21, 825.69, 825.72, 7.32, 7.33; 455/222–224, 227, 228, 296, 306, 307; 375/219, 232, 316, 317, 346, 350

(56) References Cited

U.S. PATENT DOCUMENTS

| 4,318,128 | A | | 3/1982 | Sauvanet ................... 358/147 |
|---|---|---|---|---|
| 4,937,842 | A | | 6/1990 | Howell ........................ 375/98 |
| 5,159,340 | A | | 10/1992 | Smith ......................... 341/132 |
| 5,377,054 | A | | 12/1994 | Yamaguchi et al. .......... 360/39 |
| 5,744,874 | A | | 4/1998 | Yoshida et al. ............ 307/10.1 |
| 5,834,854 | A | | 11/1998 | Williams ................... 307/10.6 |
| 6,069,499 | A | | 5/2000 | Cho et al. .................... 327/58 |
| 6,151,150 | A | | 11/2000 | Kikuchi ...................... 359/194 |
| 6,178,516 | B1 | | 1/2001 | Meade ........................ 713/300 |
| 6,236,850 | B1 | | 5/2001 | Desai .......................... 455/343 |
| 6,278,864 | B1 | * | 8/2001 | Cummins et al. ............. 455/73 |
| 6,359,348 | B1 | | 3/2002 | King .......................... 307/10.1 |
| 6,385,238 | B1 | | 5/2002 | Nguyen ...................... 375/232 |
| 6,400,040 | B1 | | 6/2002 | Scudder et al. ............ 307/10.2 |
| 6,438,184 | B1 | | 8/2002 | Nayler ........................ 375/345 |
| 2003/0149349 | A1 | * | 8/2003 | Jensen ......................... 600/372 |
| 2004/0090281 | A1 | * | 5/2004 | Vilander ..................... 331/185 |

FOREIGN PATENT DOCUMENTS

| EP | 0 676 727 A2 | 2/1995 |
|---|---|---|
| EP | 1 148 682 A2 | 10/2001 |
| GB | 2 079 084 | 1/1982 |

* cited by examiner

Primary Examiner—Donnie L. Crosland
(74) Attorney, Agent, or Firm—Bill Panagos; Bliss McGlynn, P.C.

(57) ABSTRACT

A low power consumption RF receiver system that is adapted for receiving and shaping transmitted digital data signals into a digital data stream for processing by a microprocessor is provided. The receiver system comprises an integrated circuit, which includes a data slicer adapted to accept the received digital data signals, shape the signals into a digital data stream, and pass the digital data stream to the microprocessor. The integrated circuit further includes a peak detector adapted to sense ambient circuit noise when digital data signals are not present, develop a voltage reference signal representative of the peak value of the ambient circuit noise, and pass the voltage reference signal to the data slicer. The receiver system further includes a support circuit between the peak detector and the data slicer that has a voltage divider and a charge capacitor that is adapted to accept the voltage reference signal and produce a clamping reference for the data slicer thereby preventing the data slicer from responding to ambient circuit noise and passing false digital data streams to the microprocessor.

18 Claims, 3 Drawing Sheets

CLAMPING CIRCUIT FOR AN RF RECEIVER SYSTEM

BACKGROUND OF THE INVENTION

1. Field of the Invention

The present invention relates generally to an electrical support circuit used with a RF receiver to provide a voltage reference signal to a digital data slicer circuit and, more specifically, to a clamping circuit used in a wireless RF remote controlled system adapted to provide an electrical clamping reference to prevent the data slicer from responding to ambient circuit noise and generating false digital data signals.

2. Description of the Related Art

Remote keyless entry (RKE), and remote alarm systems are known and have been available in motor vehicles for some time, but variations on these, as well as completely new wireless systems are constantly emerging. For example, passive RKE systems are now available that unlock and lock the vehicle simply by the driver moving in and out of the local range of the onboard wireless receiver. "Sentry" ignition keys, which may or may not retain the typical teeth of a key, include preprogrammed circuitry that wirelessly interact with the vehicle to identify the correct ignition key for the particular vehicle. Also, wireless tire pressure monitoring systems are available that provide a constant status of pneumatic pressure within each tire from internal mounted sensors.

In these examples of wireless communication and control systems, the operating environment within a motor vehicle presents unique obstacles that must be overcome to provide the desired results reliably and consistently. Most notably, power consumption of the components in a wireless system is an important design consideration. Characteristically, a wireless system employs at least one receiver and at least one transmitter that are remote from each other and operatively interact through a wireless radio frequency (RF) signal to provide some control function of the greater system. The transmitter typically has to operate and generate an output signal only when activated to achieve a desired action, but the receiver must be powered up and awaiting the transmitter's signal during all possible periods of operation. Thus, a receiver that is installed in a motor vehicle may operate the majority of time on battery power alone, only receiving power from the vehicle's charging system when the engine is running. In fact, in certain motor vehicle applications, the RF wireless systems are disabled or unnecessary during the periods of operation when the engine is running.

For example, regardless of how long a remote keyless entry (RKE) equipped motor vehicle is left sitting, the RKE receiver must remain constantly powered in order to receive the control signal to unlock the vehicle when transmitted by the operator. Additionally, the portions of the RKE system that interpret and process the transmitted signal, such as a microprocessor and other support components, must be able to respond whenever a transmitted signal is received. Since the only source of power when the engine of the vehicle is off is the main battery, the power consumption of the RKE receiver and the signal processing components must be designed to be extremely low. This is especially true in light of the various other onboard vehicle systems that must also draw power when the engine is off. If the required current draw from each of the onboard systems is not kept to very low levels, the drain on the vehicle's main battery will quickly discharge it, thereby disabling the vehicle.

To avoid this problem, vehicle manufacturers have placed restrictions on the current draw of wireless and other systems that must by electrically maintained when the vehicle is not running. Thus, the latest wireless systems now employ low power receivers combined with microprocessors that "sleep" to conserve power until activated by an incoming data signal. This approach has been successful to a point. However, with the addition of even more power consuming systems incorporated into future vehicles, manufactures have demanded even stricter current draw restrictions for new wireless systems. These lower current draw requirements cannot be met by present wireless circuit designs. Generally, this is due to the fact that it is difficult to control false microprocessor wake-up events.

Operationally, when a conventional wireless receiver senses an RF signal in the proper frequency range, the receiver demodulates the encoded digital signal and reshapes it into the original digital data stream. The receiver must then "wake" the microprocessor, so that the microprocessor can decode the digital data stream to first determine if it has the proper identification code and to then determine the requested command (i.e., unlock doors, unlock truck, etc). The waking of the microprocessor and its subsequent data processing actions consume a particular amount of battery power that cumulatively adds up. In order to achieve proper functioning of conventional wireless systems, this signal processing operation must be allowed to occur and power must be consumed even if the receiver occasionally responds to transmitters in the same frequency range but belonging to a different vehicle. In these cases, when the microprocessor recognizes that the subject transmitter has a different identification code it will return to its sleep mode. However, one drawback in the design of present wireless systems is that their ability to respond to incoming RF frequencies also produces a large number of false wake-ups. These false wake-ups repeatedly and cumulatively consume power and waste the limited battery resources.

False wake-ups in conventional wireless systems may be caused when the receiver picks up stray RF signals in the receiver's designed frequency range, by stray harmonics of those frequencies, or by some other electromagnetic interference. This is generally referred to as "external noise". External noise can be filtered by a variety of methods or by merely reducing the sensitivity of the receiver. On the other hand, reducing the sensitivity of the receiver may shorten the receiver's range and may require a higher-powered transmitter. However, the main cause of false microprocessor wake-ups is from "internal noise" that is generated within portions of the receiver circuitry itself Generally speaking, internal circuit noise is defined as any unwanted electrical signals present in the receiver circuitry. Internal noise is manifested by small fluctuating voltages or currents present as a function of the activity of the electronic components. Internal circuit noise can be minimized, but not eliminated. To avoid problems caused by internal circuit noise, receivers are typically designed to have a high "signal-to-noise" ratio, this represents the level of inherent internal circuit noise that can be tolerated with respect to a signal being processed. Thus, in a receiver having a high signal-to-noise ratio, during the normal RF signal processing, the noise is present merely as a very low-level background interference relative to the signal. This strategy works well in a receiver that processes a continuous signal, such as a radio. However, in applications that require the receiver to wait for an occasional transmission, such as a conventional RKE system or other known wireless RF systems, without a constantly transmitted signal to process, the noise level is often distinct and can be interpreted as a valid signal causing the receiver to repeatedly generate false microprocessor wake-ups.

Up to this point, conventional wireless receiver systems have failed to provide sufficient filtering or noise dampening that adequately attenuates or overcomes ambient internal circuit noise. Thus, they have been unable to avoid the false microprocessor wake-ups that consume excessive amounts of battery power. Therefore, there exists a need in the art to improve the receiver circuit design of low power RF wireless systems to prevent excessive amounts of current draw and power consumption caused by false microprocessor wake-ups in systems that must operate on battery power.

SUMMARY OF THE INVENTION

The disadvantages of the related art are overcome by a low power consumption RF receiver system of the present invention that is adapted for receiving and shaping transmitted digital data signals into a digital data stream for processing by a microprocessor. The receiver system comprises an integrated circuit which includes a data slicer that is adapted to accept the received digital data signals, shape the signals into a digital data stream, and pass the digital data stream to the microprocessor. The integrated circuit further includes a peak detector adapted to sense ambient circuit noise when received digital data signals are not present, develop a voltage reference signal representative of the peak value of the ambient circuit noise, and pass the voltage reference signal to the reference input of the data slicer. The receiver system further includes a support circuit electrically interposed between the peak detector and the data slicer. The support circuit has a voltage divider and a charge capacitor that is adapted to accept the voltage reference signal and produce a clamping reference for the data slicer thereby preventing the data slicer from responding to ambient circuit noise and passing false digital data streams to the microprocessor. In this manner, the present invention prevents the receiver system from drawing excessive amounts of current by eliminating false microprocessor wake-ups caused by internal noise.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
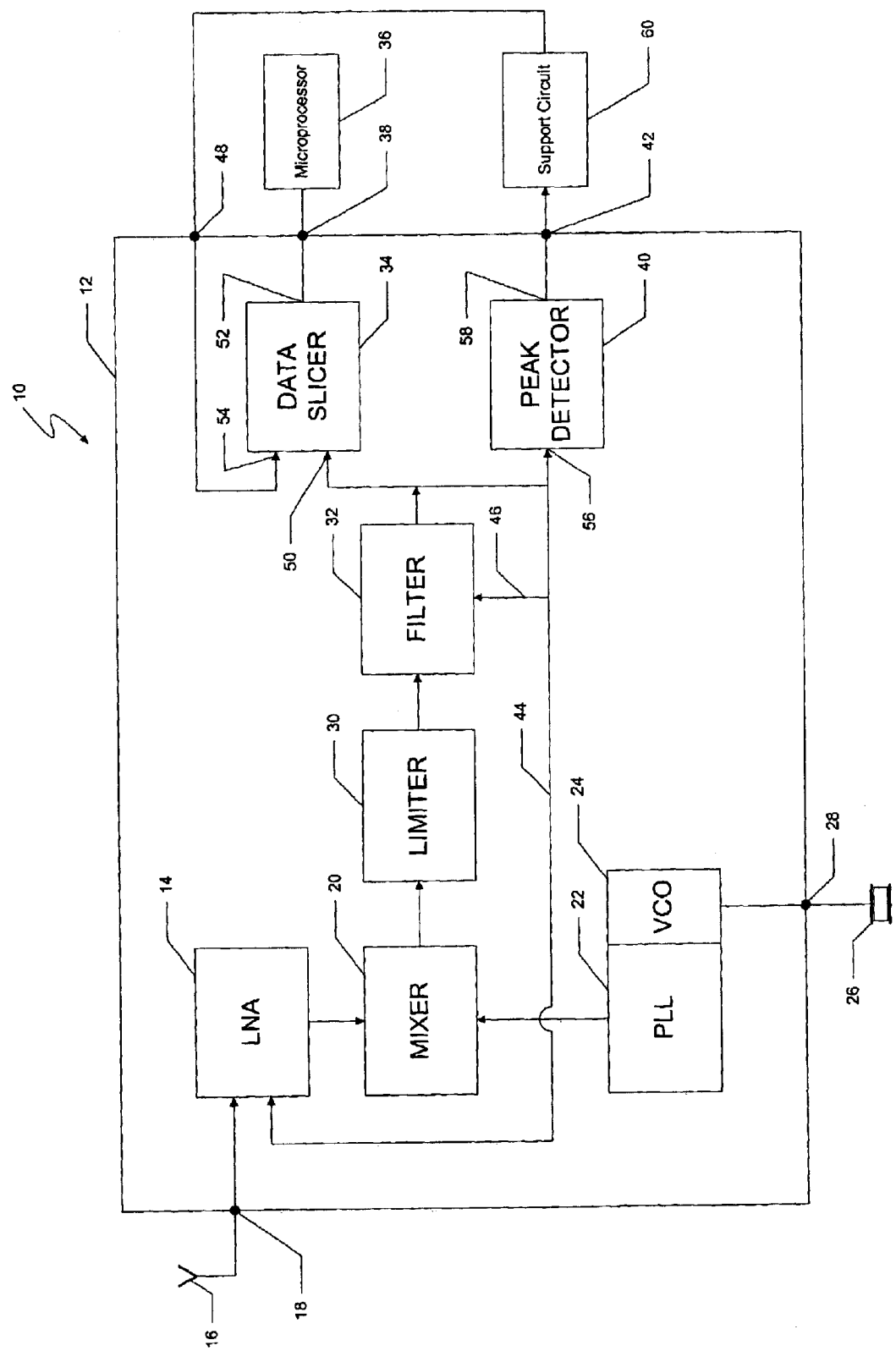
FIG. 1 is a general block diagram of a typical integrated circuit which functions as a RF receiver for use in low power wireless RF systems.

A low power consumption RF receiver system adapted for receiving and shaping transmitted digital data signals into a digital data stream for processing by a microprocessor is generally indicated at 10 in the figures, where like numerals are used to designate like structure throughout the drawings. The RF receiver system includes an integrated circuit 12. The integrated circuit 12 is a typical integrated circuit package, also referred to as an IC chip that contains the internal circuitry necessary to function as a low power consumption RF wireless receiver. More specifically, the integrated circuit 12 is comprised of a number of sub-circuits that cooperatively interact to operatively provide that functionality. As shown in FIG. 1, the sub-circuits include a low noise amplifier (LNA) 14 adapted to accept the modulated RF signals from an antenna 16 and amplify them for further processing. The RF signals as received by the antenna 16 enter the integrated circuit 12 at connection point 18. It should be appreciated that the integrated circuit 12 is physically located on a circuit board (not shown) that provides a variety of other electrical and electronic circuits, voltages, and signals that are necessary to make the integrated circuit 12 function but that are not germane to the present invention. Thus, the connections points indicated in the figures are for general reference only.

It should be further appreciated that an RF receiver of this type is used to receive a signal in the "radio frequency" range that serves as a carrier wave for digital data intelligence. The digital data, which correlates to information or a command, originates in an RF transmitter and is encoded, or modulated onto a carrier wave. The carrier wave is amplified and due to its physical nature within the RF range is capable of carrying, or propagating the modulated information over distance depending on the power of the amplified RF signal. It is this type of "wireless" RF signal that the RF receiver system described herein receives and demodulates to extract the modulated digital information. It should also be appreciated that the antenna 16 is tuned to the particular RF ranges employed in these systems. Specifically, these receiver systems are operative to receive one of a group of predetermined frequencies that fall within the ranges of 300 to 450 MHz and 780 to 915 MHz.

The integrated circuit 12 further includes a mixer 20, which is in electrical communication with the LNA 14 and is adapted to accept the amplified RF signal from the LNA 14 and mix the amplified signal with a predetermined local oscillating frequency to produce a modulated intermediate frequency (IF) signal. The IF signal still retains the modulated information but is at a specific predetermined frequency that is in a lower range than that of the RF signal. This makes the modulated digital data easier to extract. A phase locked loop (PLL) synthesizer 22 is in electrical communication with the mixer 20. The PLL synthesizer 22 incorporates a voltage controlled oscillator (VCO) 24 that is adapted to produce the predetermined local oscillating frequency signal from a base reference oscillating frequency. The PLL synthesizer 22 is in an electrically locked loop with the mixer 30 so that the local oscillating frequency that is sent to the mixer 20 is automatically adjusted to follow any fluctuations in the RF signal so that the resultant IF frequency is stable and constant. A crystal oscillator 26 is external to the integrated circuit 12 but is in electrical communication with the PLL synthesizer 22 through connection point 28 and is adapted to produce the base oscillating frequency for the PLL synthesizer 22. The crystal oscillator 26 is a known type of device that physically and electrically resonates at a known and stable frequency when voltage is applied. The output resonating frequency is based on the physical lattice structure within the type of crystal employed.

The integrated circuit 12 further includes a limiter 30, which is in electrical communication with the mixer 20 and is adapted to accept the modulated IF and act as a bandpass amplifier to demodulate the digital data from the IF and produce a raw digital data signal. In other words, the limiter 30 only amplifies a predetermined and specific range, or band, of frequencies, thus removing the IF and allowing only the raw digital data signal to pass. A data filter 32 is in electrical communication with the limiter 30 to accept the raw digital data signal from the limiter 28 and filter it down to a predetermined bandwidth for the data slicer 34. The data slicer 34 is in electrical communication with the data filter 32 to accept the filtered data signal and reconstitute the digital data stream that was originally modulated onto the received RF carrier wave for further processing by a microprocessor 36. The output from the filter 32 is also used as feedback for controlling the output of the LNA as indicated at 44 and as reflective feedback as indicated at 46.

For the purposes of this application, the microprocessor 36 is one of a type that controls a remotely operated system within a motor vehicle, such as a RKE, an alarm or security system, a remote start, or a remote monitoring system (i.e. tire pressure monitoring). It should be further appreciated that the present invention is not limited to those systems and maybe applicable to any system using a low power consumption integrated receiver circuit. As such, the output signal of the data slicer 34 is passed out of the integrated circuit 12 to the microprocessor 36 by way of connection point 38. The integrated circuit 12 also includes a peak detector 40, which is in electrical communication with the data filter 32. The peak detector 40 is adapted to accept the filtered signal and produce a direct current voltage that is proportional to the peak value of the filtered digital data signal.

More specifically, the data slicer 34 of the integrated circuit 12 has an input 50, an output 52, and a reference input 54. The data slicer 34 is adapted to accept the received digital data signals at its input 50, shape the signals into a digital data stream, and pass the digital data stream through its output 52 to the microprocessor 36. The peak detector 40 has an input 56 and an output 58, and is adapted to detect any signal at the input of the data slicer 34 and develop a voltage reference signal that is representative of the peak of the detected signal. The voltage reference signal from the output 58 of the peak detector 40 is routed out of the integrated circuit 12 at connection point 42 to a support circuit, generally indicated at 60. The support circuit 60, which will be discussed in greater detail below, develops a threshold reference signal from the output of the peak detector 40 and routes it back into the integrated circuit 12 and to the reference input 54 of the data slicer 34 through connection point 48. In this manner, the peak detector 40 not only senses proper digital data signals at its input 56, but also any ambient circuit noise when no received digital data signals are present. Thus, while the RF receiver system 10 is waiting for a valid signal, the peak detector 40 is constantly developing a voltage reference signal that is representative of the peak value of the ambient circuit noise. This noise related voltage reference signal is sent through the peak detector output 58 to a support circuit 60, which develops a threshold reference signal to be sent back to the reference input 54 of the data slicer 34. In other words, the peak detector 40 provides a voltage reference signal at all times, whether it is representative of a valid signal or ambient circuit noise. This is then used by the support circuit 60 to develop a constant threshold reference signal for the data slicer 34 that is likewise representative of a valid signal or ambient circuit noise. It should be appreciated that since the threshold reference signal is often referred to as a clamping signal, meaning that the output of the circuit that uses the reference signal is "clamped" above or below that threshold, the generating circuit such as support circuit 60 is referred to as a clamping circuit.

Figure 2:
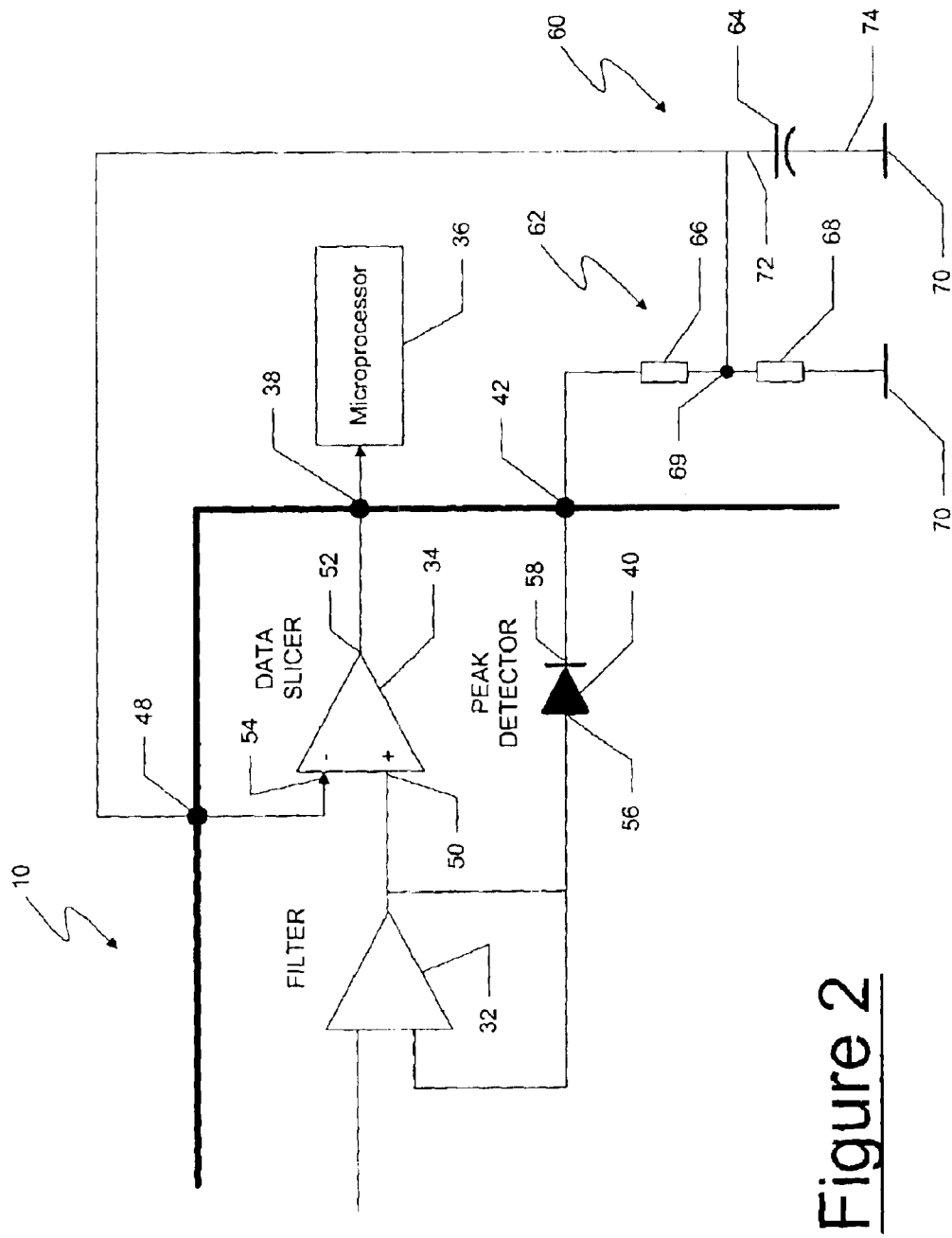
FIG. 2 is a block diagram of a portion of the integrated circuit RF receiver as illustrated in FIG. 1 and the support circuit of the present invention used as a clamping reference for the data slicer.

The support, or clamping circuit 60 is illustrated in detail in FIG. 2. The clamping circuit 60 is electrically interposed between the output 58 of the peak detector 40 and the reference input 54 of the data slicer 34. The clamping circuit 60 has a voltage divider, generally indicated at 62 and a charge capacitor 64. The clamping circuit 60 is adapted to accept the voltage reference signal from the peak detector 40 and produce a threshold reference signal, also known as a clamping reference for the data slicer 34 by first passing the output of the peak detector 40 through the voltage divider 62 and then across the charge capacitor 64.

The voltage divider 62 of support circuit 60 includes a first and a second resistor 66 and 68 that are electrically connected in series with the output of the peak detector 40 and a ground reference 70. The voltage reference signal is applied to the first series resistor 66 and the clamping reference is electrically taken from between the first and the second resistors 66, 68 at connection point 69. In combination with the charge capacitor 64, the voltage divider 62 is adapted to provide a developing resistance to cause the clamping circuit 60 to develop the clamping threshold reference voltage that tracks the voltage reference signal.

More specifically, the total series resistance of the resistors 66 and 68 of the voltage divider 62 is chosen to have a particular value so as to provide the proper timing for the RC response of the clamping circuit. The individual resistive values of resistors 66 and 68 are predetermined so that the voltage divider 62 can distinguish between the high and low voltage levels of the digital data signals for the given data rate of digital data signals being transmitted, when a signal is present. The charge capacitor 64 of the support circuit includes an electrolytic capacitor having first and second electrical leads 72 and 74. The first electrical lead 72 is adapted to operate under positive voltage potentials in relation to the second electrical lead 74. The first electrical lead 72 is electrically connected to the voltage divider 62 between the first and second resistors 72, 74 at connection point 69. The second electrical lead 74 is electrically connected a ground reference 70 to provide the clamping reference that is sent to the reference input 54 of the data slicer 34.

The capacitance value of the charge capacitor 64 is chosen so that the RC response of the clamping circuit 60 (in combination with resistors 66 and 68) is fast enough to respond to, and track the highly fluctuating ambient noise found in the integrated circuit 12. Thus, since the clamping reference is developed from the peak of any signal that is being sent to the data slicer 34, when an actual data signal is not present, the clamping reference will always be slightly above any ambient noise that inadvertently reaches the input 50 of the data slicer 34. In this manner, as the clamping reference sent to the reference input 54 of the data slicer 34 is slightly higher that the ambient noise, the data slicer 34 is prevented from responding to the ambient circuit noise and does not pass a false digital data stream to wake-up the microprocessor 36.

Figure 3:
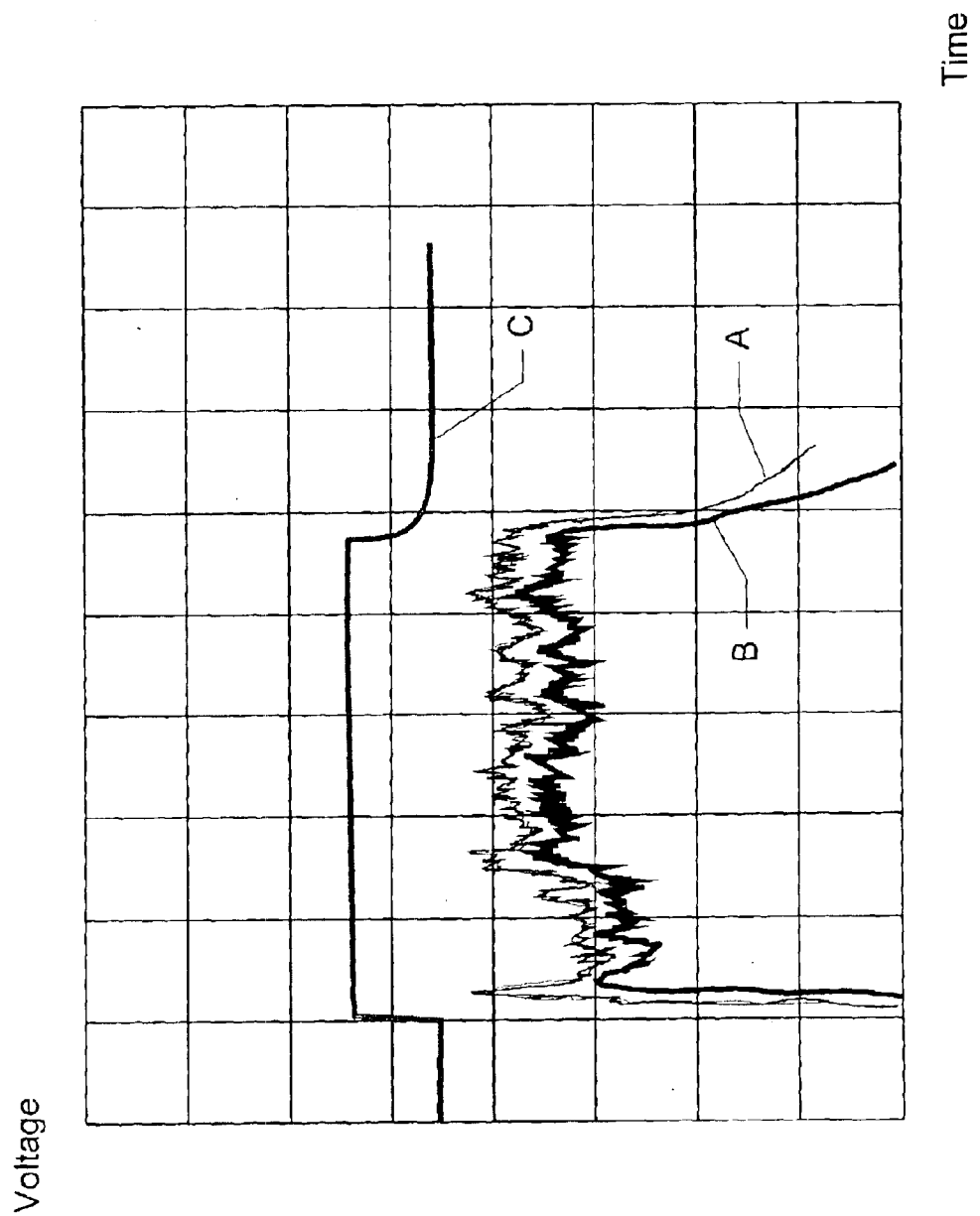
FIG. 3 is a representation of an oscilloscope display of the signals generated by the integrated circuit RF receiver as illustrated in FIG. 1 having the support circuit of the present invention as illustrated in FIG. 2, which indicates the resultant suppression of internal circuit noise thereby preventing false microprocessor wake-ups.

A graphic representation of this interaction is illustrated in FIG. 3 where an oscilloscope display indicates the actions of the clamping circuit 60 and the data slicer 34. In FIG. 3, the horizontal axis is representative of time and the vertical axis is representative of signal amplitude, or voltage levels. Trace A indicates the highly fluctuating ambient noise in the integrated receiver circuit 12 at the input 50 of the data slicer 34 when no data signal is present. Trace B shows the response of the clamping circuit 60 as taken at the reference input 54 of the data slicer 34. As can be seen, the clamping circuit 60 is successful in developing a reference level that is responsive to the changes in the ambient noise and remains below the noise level (Trace A). As the signal shown in Trace B is applied to the reference input 54 of the data slicer 34, the data slicer is clamped to the threshold reference and its output (as seen in Trace C) remains high and does not pass signals to, or wake the microprocessor 36.

It should be appreciated that Trace A and Trace B are shown in relative amplitude relation to each other, so that Trace B is shown as remaining below the Trace A noise level. This is necessary since the data slicer 34 is a comparator type of electronic device having, by nature, one positive and one negative, or inverted input. This means that a signal placed on the positive input of the data slicer 34, in this case input 50, will be received and understood without being changed. However, a signal placed on the negative input to the data slicer 34, in this case the reference input 54, will be inverted as it is received. Thus, the clamping reference, as it is developed, must be below the noise signal that is applied to the positive input (input 50) of the data slicer 34 in order to provide a clamping reference to the negative input (reference input 54) of the data slicer 34 that actually exceeds the noise level and prevents the data slicer 34 from passing a signal. Trace C is not displayed in amplitude relation to Trace A and Trace B and shows the steady state output of the data slicer 34 with no false digital data signals that would wake the microprocessor 36.

When actual digital data is sent to the data slicer 34, the peak detector 40 develops a peak voltage reference that represents the highs and lows (ones and zeros) of the data. The incoming digital data, and thus the voltage reference, occurs at a data rate that will exceed the RC response time of the clamping circuit 60. Thus, the clamping circuit 60 will not be able to follow the rise and fall of the voltage reference signal caused by the digital data, which will allow the data at the input 50 of the data slicer 34 to exceed the clamping threshold at its reference input 54. The clamping threshold reference will be repeatedly exceeded in a manner that replicates the digital data. This allows the data slicer 34 to reconstitute and reshape the raw digital data signal into the original digital data stream and to pass it to the microprocessor 36.

Thus, when a valid digital data signal is present, the support circuit 60 allows the data slicer 34 to reconstitute the digital data stream so that the data is properly passed to the microprocessor 36 for further processing. However, more importantly, when a valid digital data signal is not present, the support circuit 60 of the present invention provides a proper clamping reference, which prevents the data slicer 34 from responding to ambient circuit noise and passing false digital data streams to the microprocessor 36. This eliminates the power draining false wake-ups of the microprocessor 36 and its circuitry.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A low power consumption RF receiver system adapted for receiving and shaping transmitted digital data signals into a digital data stream for processing by a microprocessor, said receiver system comprising:

an integrated circuit which includes a data slicer having an input, an output, and a reference input, said data slicer adapted to accept the received digital data signals at its input, shape the signals into a digital data stream, and pass the digital data stream through its output to the microprocessor, said integrated circuit further includes a peak detector having an input and an output, said peak detector adapted to sense ambient circuit noise at its input when received digital data signals are not present, develop a voltage reference signal representative of the peak value of the ambient circuit noise, and pass the voltage reference signal through its output to said reference input of said data slicer; and a support circuit electrically interposed between said output of said peak detector and said reference input of said data slicer, said support circuit having a voltage divider and a charge capacitor that is adapted to accept said voltage reference signal and produce a clamping reference for said data slicer by first passing the output of said peak detector through said voltage divider and then across said charge capacitor such that said clamping reference thereby prevents said data slicer from responding to ambient circuit noise and passing false digital data streams to the microprocessor.

2. A low power consumption RF receiver system as set forth in claim 1 wherein said voltage divider further includes a first and a second resistor electrically connected in series with said output of said peak detector and a ground reference, said voltage reference signal applied to said first series resistor, said clamping reference electrically taken from between said first and said second resistors, said voltage divider adapted to set the clamping reference limits and to provide developing resistance to cause said voltage divider to develop said clamping reference voltage that tracks said voltage reference signal.

3. A low power consumption RF receiver system as set forth in claim 2 wherein said charge capacitor of said support circuit includes an electrolytic capacitor having first and second electrical leads, the first electrical lead adapted to operate under positive voltage potentials in relation to the second electrical lead, the first electrical lead electrically connected to said voltage divider between said first and said second resistors and the second electrical lead electrically connected a ground reference to provide the clamping reference sent to said reference input of said data slicer circuit.

4. A low power consumption RF receiver system as set forth in claim 1 wherein said receiver further includes an antenna tuned to receive data modulated RF signals from a remote transmitter.

5. A low power consumption RF receiver system as set forth in claim 4 wherein said integrated circuit further includes:

a low noise amplifier (LNA) adapted to accept the modulated RF signals from said antenna and amplify them for further processing;

a mixer in electrical communication with said LNA adapted to accept the amplified incoming modulated RF signal from said amplifier and mix the amplified signal with a predetermined local oscillating frequency to produce a modulated intermediate frequency;

a phase locked loop (PLL) synthesizer in electrical communication with said mixer, said PLL synthesizer having a voltage controlled oscillator adapted to produce the predetermined local oscillating frequency signal from a base reference oscillating frequency;

a crystal oscillator in electrical communication with said phase locked loop synthesizer and adapted to produce the base oscillating frequency for said phase locked loop synthesizer;

a limiter in electrical communication with said mixer to accept the modulated intermediate frequency and adapted to act as a bandpass amplifier to demodulate the digital data from the intermediate frequency and produce a raw digital data signal;

a data filter in electrical communication with said limiter to accept the raw digital data signal from said limiter and adapted to filter the raw digital data signal to a predetermined bandwidth for said data slicer, said data slicer in electrical communication with said data filter to accept the filtered data signal and reconstitute the digital data stream that was originally modulated on the received RF carrier wave for further processing by the microprocessor; and a peak detector also in electrical communication with said data filter adapted to accept the filtered signal and produce a direct current voltage that is proportional to the peak value of the filtered digital data signal for use in controlling the output of said LNA and as a reference for said data slicer by way of said support circuit.

6. A low power consumption RF receiver system as set forth in claim 4 wherein said integrated circuit is tuned to receive one of a group of predetermined frequencies that fall within the ranges of 300 to 450 MHz and 780 to 915 MHz.

7. A remote keyless entry system for a motor vehicle having a low power consumption RF receiver system adapted for receiving and shaping transmitted digital data signals into a digital data stream for processing by a microprocessor, said receiver comprising:

an integrated circuit which includes a data slicer having an input, an output, and a reference input, said data slicer adapted to accept the received digital data signals at its input, shape the signals into a digital data stream, and pass the digital data stream through its output to the microprocessor, said integrated circuit further includes a peak detector having an input and an output, said peak detector adapted to sense ambient circuit noise at its input when received digital data signals are not present, develop a voltage reference signal representative of the peak value of the ambient circuit noise, and pass the voltage reference signal through its output to said reference input of said data slicer; and a support circuit electrically interposed between said output of said peak detector and said reference input of said data slicer, said support circuit having a voltage divider and a charge capacitor that is adapted to accept said voltage reference signal and produce a clamping reference for said data slicer by first passing the output of said peak detector through said voltage divider and then across said charge capacitor such that said clamping reference thereby prevents said data slicer from responding to ambient circuit noise and passing false digital data streams to the microprocessor.

8. A remote keyless entry system as set forth in claim 7 wherein said voltage divider further includes a first and a second resistor electrically connected in series with said output of said peak detector and a ground reference, said voltage reference signal applied to said first series resistor, said clamping reference electrically taken from between said first and said second resistors, said voltage divider adapted to set the clamping reference limits and to provide developing resistance to cause said voltage divider to develop said clamping reference voltage that tracks said voltage reference signal.

9. A remote keyless entry system as set forth in claim 8 wherein said charge capacitor of said support circuit includes an electrolytic capacitor having a first and a second electrical lead, said first electrical lead adapted to operate under positive voltage potentials in relation said second electrical lead, said first electrical lead electrically connected to said voltage divider between said two resistors and said second electrical lead electrically connected a ground reference to provide the clamping reference sent to said reference input of said data slicer circuit.

10. A remote keyless entry system as set forth in claim 7 wherein said receiver further includes an antenna tuned to receive data modulated RF signals from a remote transmitter.

11. A remote keyless entry system as set forth in claim 10 wherein said integrated circuit further includes:

a low noise amplifier (LNA) adapted to accept the modulated RF signals from said antenna and amplify them for further processing;

a mixer in electrical communication with said LNA adapted to accept the amplified incoming modulated RF signal from said amplifier and mix the amplified signal with a predetermined local oscillating frequency to produce a modulated intermediate frequency;

a phase locked loop (PLL) synthesizer in electrical communication with said mixer, said PLL synthesizer having a voltage controlled oscillator adapted to produce the predetermined local oscillating frequency signal from a base reference oscillating frequency;

a crystal oscillator in electrical communication with said phase locked loop synthesizer and adapted to produce the base oscillating frequency for said phase locked loop synthesizer;

a limiter in electrical communication with said mixer to accept the modulated intermediate frequency and adapted to act as a bandpass amplifier to demodulate the digital data from the intermediate frequency and produce a raw digital data signal;

a data filter in electrical communication with said limiter to accept the raw digital data signal from said limiter and adapted to filter the raw digital data signal to a predetermined bandwidth for said data slicer, said data slicer in electrical communication with said data filter to accept the filtered data signal and reconstitute the digital data stream that was originally modulated on the received RF carrier wave for further processing by the microprocessor; and a peak detector also in electrical communication with said data filter adapted to accept the filtered signal and produce a direct current voltage that is proportional to the peak value of the filtered digital data signal for use in controlling the output of said LNA and as a reference for said data slicer by way of said support circuit.

12. A remote keyless entry system as set forth in claim 10 wherein said integrated circuit is tuned to receive one of a group of predetermined frequencies that fall within the ranges of 300 to 450 MHz and 780 to 915 MHz.

13. An alarm system having a low power RF receiver system adapted for receiving and shaping transmitted digital data signals into a digital data stream for processing by a microprocessor, said receiver comprising:

an integrated circuit which includes a data slicer having an input, an output, and a reference input, said data slicer adapted to accept the received digital data signals at its input, shape the signals into a digital data stream, and pass the digital data stream through its output to the microprocessor, said integrated circuit further includes a peak detector having an input and an output, said peak detector adapted to sense ambient circuit noise at its input when received digital data signals are not present, develop a voltage reference signal representative of the peak value of the ambient circuit noise, and pass the voltage reference signal through its output to said reference input of said data slicer; and a support circuit electrically interposed between said output of said peak detector and said reference input of said data slicer, said support circuit having a voltage divider and a charge capacitor that is adapted to accept said voltage reference signal and produce a clamping reference for said data slicer by first passing the output of said peak detector through said voltage divider and then across said charge capacitor such that said clamping reference thereby prevents said data slicer from responding to ambient circuit noise and passing false digital data streams to the microprocessor.

14. An alarm system as set forth in claim 13 wherein said integrated circuit is adapted to receive and respond to transmitted signals from remote sensors, said receiver further includes a power circuit that provides an automatically switch over from a main source of operative power to battery power when the main source of operative power is interrupted, thereby allowing said receiver to be remain operative to receive transmitted signals.

15. An alarm system as set forth in claim 14 wherein said voltage divider further includes a first and a second resistor electrically connected in series with said output of said peak detector and a ground reference, said voltage reference signal applied to said first series resistor, said clamping reference electrically taken from between said first and said second resistors, said voltage divider adapted to set the clamping reference limits and to provide developing resistance to cause said voltage divider to develop said clamping reference voltage that tracks said voltage reference signal.

16. An alarm system as set forth in claim 15 wherein said charge capacitor of said support circuit includes an electrolytic capacitor having first and second electrical leads, the first electrical lead adapted to operate under positive voltage potentials in relation to the second electrical lead, the first electrical lead electrically connected to said voltage divider between said first and said second resistors and the second electrical lead electrically connected a ground reference to provide the clamping reference sent to said reference input of said data slicer circuit.

17. An alarm system as set forth in claim 13 wherein said integrated circuit further includes:

a low noise amplifier (LNA) adapted to accept the modulated RF signals from said antenna and amplify them for further processing;

a mixer in electrical communication with said LNA adapted to accept the amplified incoming modulated RF signal from said amplifier and mix the amplified signal with a predetermined local oscillating frequency to produce a modulated intermediate frequency;

a phase locked loop (PLL) synthesizer in electrical communication with said mixer, said PLL synthesizer having a voltage controlled oscillator adapted to produce the predetermined local oscillating frequency signal from a base reference oscillating frequency;

a crystal oscillator in electrical communication with said phase locked loop synthesizer and adapted to produce the base oscillating frequency for said phase locked loop synthesizer;

a limiter in electrical communication with said mixer to accept the modulated intermediate frequency and adapted to act as a bandpass amplifier to demodulate the digital data from the intermediate frequency and produce a raw digital data signal;

a data filter in electrical communication with said limiter to accept the raw digital data signal from said limiter and adapted to filter the raw digital data signal to a predetermined bandwidth for said data slicer, said data slicer in electrical communication with said data filter to accept the filtered data signal and reconstitute the digital data stream that was originally modulated on the received RF carrier wave for further processing by the microprocessor; and a peak detector also in electrical communication with said data filter adapted to accept the filtered signal and produce a direct current voltage that is proportional to the peak value of the filtered digital data signal for use in controlling the output of said LNA and as a reference for said data slicer by way of said support circuit.

18. An alarm system as set forth in claim 17 wherein said integrated circuit is tuned to receive one of a group of predetermined frequencies that fall within the ranges of 300 to 450 MHz and 780 to 915 MHz.

* * * * *